US009286629B2

(12) United States Patent
Miller et al.

(10) Patent No.: US 9,286,629 B2
(45) Date of Patent: Mar. 15, 2016

(54) METHODS AND SYSTEMS FOR TRANSACTING TRAVEL-RELATED GOODS AND SERVICES

(75) Inventors: Jonathan David Miller, Toronto (CA); Harold Roy Miller, Toronto (CA); Steven Mark Seider, Toronto (CA)

(73) Assignee: Amgine Technologies (US), Inc., Austin, TX (US)

(*) Notice: Subject to any disclaimer, the term of this patent is extended or adjusted under 35 U.S.C. 154(b) by 139 days.

(21) Appl. No.: 13/419,989

(22) Filed: Mar. 14, 2012

(65) Prior Publication Data

US 2012/0239669 A1 Sep. 20, 2012

(51) Int. Cl.
*G06F 17/30* (2006.01)
*G06Q 30/06* (2012.01)
*G06F 17/27* (2006.01)

(52) U.S. Cl.
CPC .......... *G06Q 30/06* (2013.01); *G06F 17/2785* (2013.01); *G06F 17/30401* (2013.01)

(58) Field of Classification Search
CPC ................................................ G06F 17/30401
USPC ......................................................... 707/755
See application file for complete search history.

(56) References Cited

U.S. PATENT DOCUMENTS

| 6,275,808 | B1 | 8/2001 | DeMarcken | |
| 2002/0082877 | A1* | 6/2002 | Schiff et al. | 705/5 |
| 2003/0055690 | A1* | 3/2003 | Garback | G06Q 10/02 705/5 |
| 2003/0055772 | A1* | 3/2003 | Goldstein | G06Q 30/02 705/37 |
| 2004/0111255 | A1 | 6/2004 | Huerta et al. | |
| 2004/0249680 | A1* | 12/2004 | Liew et al. | 705/5 |
| 2005/0038644 | A1* | 2/2005 | Napper et al. | 704/9 |
| 2005/0043940 | A1* | 2/2005 | Elder | 704/9 |
| 2005/0108068 | A1 | 5/2005 | Marcken et al. | |

(Continued)

FOREIGN PATENT DOCUMENTS

| WO | WO2012125742 | 9/2012 |
| WO | WO2012125753 | 9/2012 |

(Continued)

OTHER PUBLICATIONS

International Search Report and Written Opinion dated Jun. 15, 2012 in application No. PCT/US2012/029121.

(Continued)

*Primary Examiner* — Noosha Arjomandi
(74) *Attorney, Agent, or Firm* — Carr & Ferrell LLP

(57) ABSTRACT

Provided are methods and systems for efficient matching of suppliers and customers for travel-related and other types of goods and services. These methods and systems are based on an exchange or market concept, in which a computer system performs matching between different parties. Specifically, an exchange system may compare customers' requests with suppliers' content records. In certain embodiments, an exchange system sends notifications of customers' requests to suppliers based on criteria presented by the suppliers. Users' requests and/or vendors' content records may be processed using natural language parser to determine appropriate components for searches and matches. This substantially improves efficiency of the exchange system and makes it more user friendly as users and vendors may present different terms in their respective searches and entries. An exchange system may include a pattern recognition component and semantic natural language parser to perform this function.

16 Claims, 12 Drawing Sheets

(56) References Cited

U.S. PATENT DOCUMENTS

| | | | |
|---|---|---|---|
| 2005/0220278 A1 | 10/2005 | Zirngibl et al. | |
| 2006/0106655 A1* | 5/2006 | Lettovsky et al. | 705/6 |
| 2007/0106497 A1 | 5/2007 | Ramsey et al. | |
| 2007/0143154 A1* | 6/2007 | Ashby | G06Q 10/02 705/5 |
| 2007/0156469 A1 | 7/2007 | Bird et al. | |
| 2007/0174350 A1* | 7/2007 | Pell et al. | 707/201 |
| 2007/0203735 A1 | 8/2007 | Ashton | |
| 2008/0021748 A1* | 1/2008 | Bay | G06Q 10/025 705/6 |
| 2008/0059454 A1 | 3/2008 | Andrieu | |
| 2008/0103949 A1* | 5/2008 | Lobana et al. | 705/35 |
| 2008/0114623 A1* | 5/2008 | Berthaud | G06Q 10/02 705/5 |
| 2008/0120306 A1 | 5/2008 | Panabaker et al. | |
| 2008/0201178 A1 | 8/2008 | Vizitei | |
| 2008/0319803 A1* | 12/2008 | Heyraud | G06Q 50/14 705/5 |
| 2009/0006143 A1 | 1/2009 | Orttung et al. | |
| 2009/0070322 A1 | 3/2009 | Salvetti et al. | |
| 2009/0210262 A1* | 8/2009 | Rines et al. | 705/5 |
| 2009/0234681 A1* | 9/2009 | Champernowne | 705/5 |
| 2009/0319305 A1* | 12/2009 | Weissert | G06Q 10/02 705/5 |
| 2010/0010841 A1 | 1/2010 | Cooper et al. | |
| 2010/0217680 A1* | 8/2010 | Fusz | G06Q 30/0283 705/26.1 |
| 2010/0318386 A1 | 12/2010 | Vaughan et al. | |
| 2011/0046989 A1 | 2/2011 | Crean et al. | |
| 2011/0167003 A1* | 7/2011 | Nice et al. | 705/50 |
| 2012/0233207 A1* | 9/2012 | Mohajer | 707/769 |
| 2012/0239440 A1 | 9/2012 | Miller et al. | |
| 2012/0239443 A1 | 9/2012 | Miller et al. | |
| 2013/0096965 A1 | 4/2013 | Pappas et al. | |
| 2013/0132129 A1 | 5/2013 | Fox et al. | |
| 2015/0046201 A1 | 2/2015 | Miller et al. | |

FOREIGN PATENT DOCUMENTS

| | | |
|---|---|---|
| WO | WO2012125761 | 9/2012 |
| WO | WO2015021180 | 2/2015 |

OTHER PUBLICATIONS

International Search Report and Written Opinion dated Jun. 7, 2012 in application No. PCT/US2012/029098.

International Search Report and Written Opinion dated Mar. 14, 2013 in application No. PCT/US2012/029112.

International Search Report and Written Opinion dated Nov. 24, 2014 in application No. PCT/US2014/049979.

United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>.

Mackenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>.

Boardman, Al. "Options Away." Vimeo. May 24, 2013. Retrieved on Oct. 17, 2014 from Internetnet URL <http://vimeo.com/66936261>.

* cited by examiner

METHODS AND SYSTEMS FOR TRANSACTING TRAVEL-RELATED GOODS AND SERVICES

CROSS-REFERENCE TO RELATED APPLICATIONS

This application claims the benefit of U.S. Provisional Application No. 61/452,633, filed on Mar. 14, 2011. This application is related to U.S. application Ser. No. 13/420,433, filed on Mar. 14, 2012, and to U.S. application Ser. No. 13/420,179, filed on Mar. 14, 2012. All of the above-referenced applications are hereby incorporated by reference in their entirety.

FIELD

This application relates generally to operating product and services exchange systems and more specifically to methods and systems for delivering content records to consumers using exchange systems based on matching consumers' request with various aspects of the content records.

BACKGROUND

Travel reservations traditionally involved manual steps, taken by either a travel agent or individual traveler, such as itinerary searching, scheduling, and booking. For example, many travel agents still use cryptic codes to search airline and other types of databases and retrieve thousands of unsorted records. Agents are often tasked to sort through these records and manually select various options. The process becomes particularly difficult when multiple databases are involved for developing complex itineraries, such as reserving multiple flights, hotel, car, and restaurants. In addition to relying on travel agents, customers may check options available from online aggregators, magazines, newspapers.

Not only are travel reservation processes are very cumbersome and inefficient, they also prone to human error. As a result, itineraries often have to be modified. There is often an environmental cost to the overall process in the form of printing and faxing and direct costs of human resources, such as travel agents and customers. Finally, because of inefficiencies, customers are not often presented with the best matches, while options presented by suppliers do not always reach customers that are in greatest need.

SUMMARY

Provided are methods and systems for efficient matching of suppliers and customers for travel-related and other types of goods and services. These methods and systems are based on an exchange or market concept, in which a computer system performs matching between different parties. Specifically, an exchange system may compare customers' requests with suppliers' content records. In certain embodiments, an exchange system sends notifications of customers' requests to suppliers based on criteria presented by the suppliers. Users' requests and/or vendors' content records may be processed using natural language parser to determine appropriate components for searches and matches. This substantially improves efficiency of the exchange system and makes it more user friendly as users and vendors may present different terms in their respective searches and entries. An exchange system may include a pattern recognition component and semantic natural language parser to perform this function.

In certain embodiments, a method for publishing content in an exchange system for viewing by customers involves receiving a content record from a supplier system and defining a type or category of the content record. The method may also involve defining metadata associated with the content record and publishing the content record in a public domain of the exchange system. The public domain may be viewable and searchable by one or more consumers. The method may involve processing the metadata to create one or more natural language parser (NLP) components, receiving and parsing a request from a consumer, constructing a search query from the request, and retrieving and transmitting results to the consumer. Examples of the content record types include an air ticket type, a hotel type, a car rental type, and a tour type.

In certain embodiments, the metadata includes one or more value sets corresponding to the one or more selected metadata tags. The metadata may be stored in a metadata database of the exchange system. In certain embodiments, receiving, defining, and publishing operations are performed simultaneously for multiple content records. In the same or other embodiments, receiving, defining, and publishing operations are repeated for one or more additional content records.

In certain embodiments, the one or more natural language parser (NLP) components are created based on the type of the content record and/or one or more tags of the metadata. Processing the metadata may involve retrieving additional attributes associated with the content type. Processing the metadata may also involve defining an equivalence class of phrases corresponding to the one or more natural language parser (NLP) components. Defining the equivalence class of phrases includes extracting one or more data points from the metadata. The one or more data points may be selected from one or more of the following: a metadata record name, metadata record value type, and metadata record value set. The exchange system is configured to add a new phrase to equivalence classes when encountering a metadata record type.

In certain embodiments, parsing the request includes splitting the request into multiple line items, decoding each of the multiple lines, determining a type of the request, and matching a node to the type. The search query may be constructed from the request in the form of an SQL search expression supported by a database of the exchange system.

Provided also is a method for delivering a content record to a consumer using an exchange system. The method may involve receiving and parsing a request from a consumer, determining a profile associated with the consumer or with the request, publishing the request in a database of the exchange system, receiving one or more offers from one or more supplier systems, and transmitting the one or more offers to the consumer. The method may also involve receiving, from the consumer, an acceptance corresponding to an accepted offer selected from the one or more offer and changing a status of a content record associated with the accepted offer. The method may also involve processing a payment associated with the accepted offer. The method may also involve matching the profile with metadata tags published by one or more vendors, selecting one or more selected vendors having metadata tags matching the profile, and sending one or more notifications to the one or more selected vendors. The method may involve matching the request with one or more content records available in the database of the exchange system and automatically generating at least one of the one or more offers. The request may correspond to multiple different types of content records in the database of the exchange system, such as an airline ticket, hotel reservation, and car rental reservation.

Provided also is an exchange system for matching one or more content record of one or more vendors with one or more request received from one or more consumers. The exchange system may include an exchange content data base for storing one or more content records provided by one or more vendors, metadata database for storing one or more requests and corresponding metadata received from one or more consumers, and pattern recognition component for recognizing one or more predefined patterns in the one or more requests received from the one or more consumers. The exchange system may also include a semantic natural language parser, content requirement module, and content search engine.

Other features, examples, and embodiments are described below.

DETAILED DESCRIPTION

Figure 1:
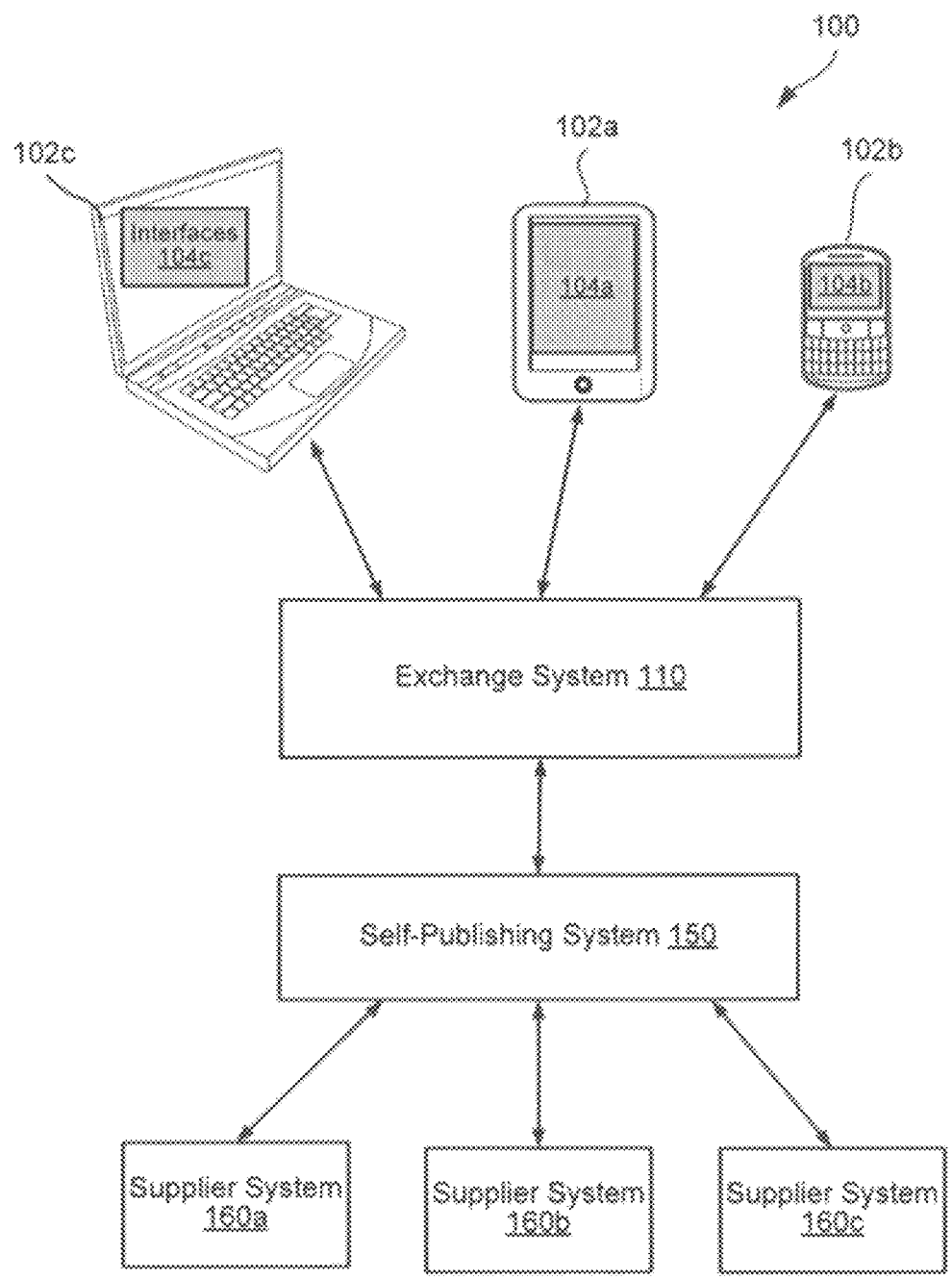
FIG. 1 is a schematic representation of an overall architecture including an exchange system.

Travel and many other industries that involve multiple suppliers and consumers and custom products suffer from innumerable problems due to complexity of information involved in transactions and multiplicity of parties. Variety of products and services, such as specific flight destinations, travel times, and associated requirements and complementary products and services make standardization particularly difficult. Often, some cluster markets are created by travel agents or other human interfaces that are capable of understanding to a limited extent supply side offerings and demand side requirements.

Methods and systems described herein provide efficient matching of suppliers and customers for travel-related and other types of goods and services by utilizing a computerized exchange or market concept. A computer system, also known as an exchange system, is specifically configured to parse through customers' requests with suppliers' content records and present them in a format more suitable for automated searching and matching. Specifically, users' requests and/or vendors' content records may be processed using natural language parser to determine appropriate components for searches and matches. To perform these functions, an exchange system may include a pattern recognition component and semantic natural language parser to perform this function.

Methods and systems described herein address various problems listed below that are often associated with traditional markets having custom products and multiple players. Specifically, structured inventories and systems may force only a limited type of requests to be serviced. That is if a system designed for airline reservations, it generally cannot be used for hotel reservations. The proposed exchange system allows any types of requests and content records to coexist and may be aggregated in a proposed solution for a customer. Furthermore, complex requests that combine multiple content records may be serviced by the exchange systems because of its ability to handle multiple types of requests and content records. These multiple content records may have various dependencies between them. For example, flight information may be linked to car reservation location and dates as well as to hotel reservation location and dates. As such, the exchange system is not limited to a particular content and may be expanded together with suppliers, industry or markets trends, and other market forces.

Using the exchange system, consumers can reach a variety of available inventory easily without a need to contact any sales agents (e.g., travel agents) or accessing multiple database interfaces, such as one database for flight information and another database for car reservation. Customers can search across multiple categories using simple natural language queries. For example, a consumer can enter the following string "I need a flight on 2012 Mar. 22 from Toronto to Seattle, return flight three days later, and a hotel reservation in Seattle near the airport." Based on this string, the exchange system may request additional information, such as flight time preferences, seat level preferences (coach, business, first), hotel preferences (e.g., smoking or not), and other like information. The string may be parsed into natural language parser (NLP) components to enable these functions. The exchange system may then conduct a search of content records stored in the system. Depending on the retrieved results and acceptance of these results by the customer, the exchange system may also post the request on the exchange for suppliers to offer new content records that have not been previously available to the system. In certain embodiments, the exchange system may send notifications to selected suppliers based on one or more types included in the request. In the above example, the system may send notification to hotel vendors in Seattle and/or to airlines that fly between Toronto and Seattle.

A customer is not restricted to particular fields when presenting his or her request, which is believed to enhance the quality and quantity of information that the customer provides. Furthermore, free flow of information allows creative approaches for structuring requests and ultimately finding better matches. Often a consumer does not care or know about particular fields and forcing consumer to enter information into these fields may lead to wrong results.

Free flow of information between consumers and suppliers increases availability of this information and, as a result, options for both sides of the transactions. This in turn makes it easier for the system to cater complex requests as explained above. Traditional travel reservation systems are limited to players that support the system, e.g., a group of airlines that support this system, and not available to other players. Likewise, GDS and TI Network control aggregation of supply and demand and thereby restrict information and available options. The exchange system uses an open concept, which is available to a certain extent to all market participants. Some initial control may be provided to avoid malicious use of the exchange systems, such as positing content records that are not in fact supported by inventory.

FIG. 1 is a schematic representation of an overall architecture 100 including an exchange system 110. Exchange system 110 may allow direct connection customer devices 102a-102c (also referred to herein as consumer devices) using, for example, a web interface provided by components of exchange system 110. Exchange system 110 may be also connected to self-publishing system 150 used by suppliers. In certain embodiments, exchange system 110 integrates self-publishing system 150. Self-publishing system 150 may be used for access by supplier systems 160a-160c to enter content records, define content record types, and publish content records as further explained below.

Consumer devices 102a-102c may be any types of computer systems capable of supporting a web browser and having some input and output means. Some examples of consumer devices include desktops, laptops, notebooks, ultrabooks, tablet computer, handheld computers, personal digital assistants (e.g., palmtop computers, enterprise digital assistants), mobile phones (e.g., smartphones), portable media players, E-book readers, game consoles, and head mounted displays. These devices may have variety of screen sizes and input options.

Consumer devices 102a-102c may be connected to exchange system 110 using a network (not specifically shown in FIG. 1). The network may take any suitable form, such as a wide area network or Internet and/or one or more local area networks (LAN's). The network may include any suitable number and type of devices, e.g., routers and switches, for forwarding commands, content, and/or web object requests from each consumer to the online community application and responses back to the consumers.

The systems and methods described herein may also be practiced in a wide variety of network environments including, for example, TCP/IP-based networks, telecommunications networks, wireless networks and so forth. In addition, the computer program instructions may be stored in any type of computer-readable media. The program may be executed according to a variety of computing models including a consumer/server model, a peer-to-peer model, on a stand-alone computing device, or according to a distributed computing model in which various functionalities described herein may be effected or employed at different locations.

Consumer devices 102a-102c may be capable to support web browsers to generate user interface 104a-104c. Web browsers allow consumers to access various applications of exchange systems. Generally, no additional software (specific to exchange system 110) needs to be installed on consumer devices 102a-102c to implement described methods and systems. Web browsers installed on consumer devices 102a-102c should be supported by a web server or, more specifically, by ERP interface module. Some examples of web browsers include Netscape Navigator, Netscape Communicator, Internet Explorer, Opera, Mozilla Navigator, Safari, Mozilla Firefox, and Google Chrome.

Figure 2:
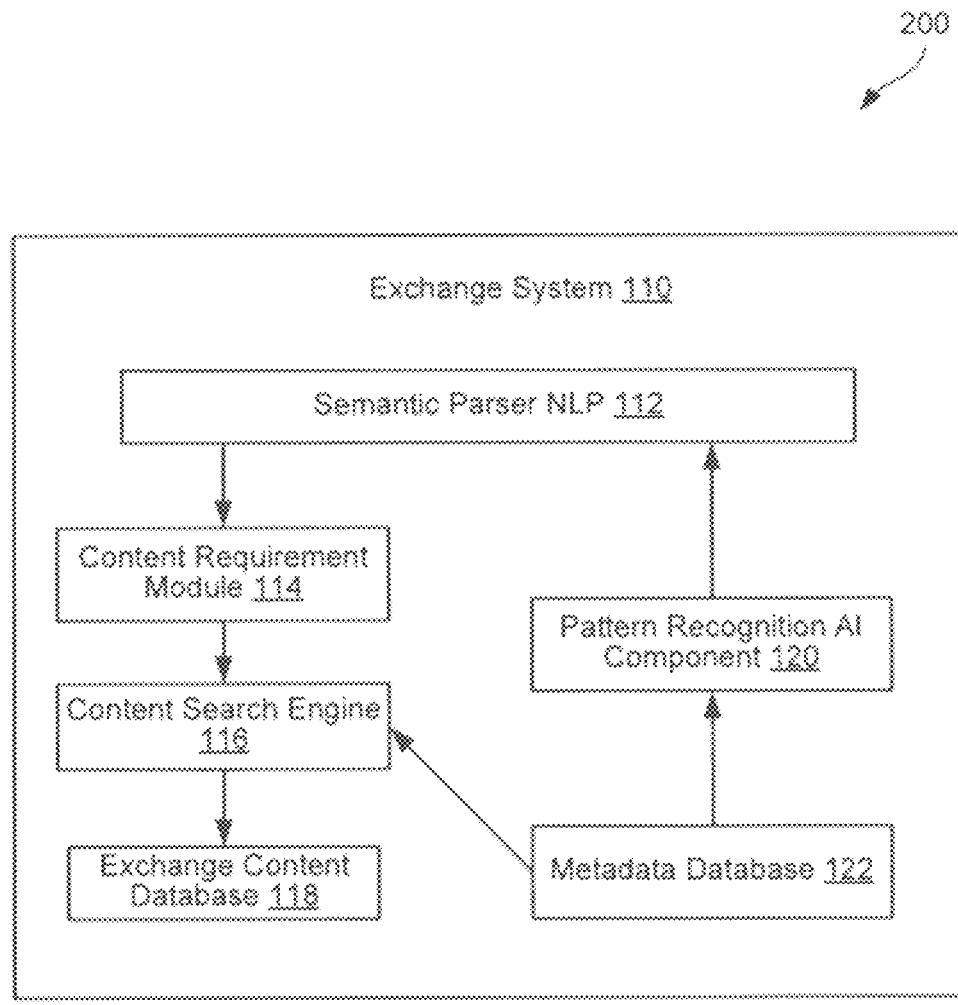
FIG. 2 is a schematic representation of various components of an exchange system.

FIG. 2 is a schematic representation 200 of various components of exchange system 110. These components include exchange content database 118 for storing one or more content records provided by one or more vendors. Another component is metadata database 122 for storing one or more requests and corresponding metadata received from one or more consumers. Exchange system 110 also includes pattern recognition AI component 120 for recognizing one or more predefined patterns in the one or more requests received from the one or more consumers. Additional components shown in FIG. 2 include semantic parser NLP 112, content requirement module 114, and content search engine 116. In certain embodiments, semantic parser NLP 112 and content search engine 116 are configured to interact with consumer devices 102a-102c to provide and receive information from these devices. This interaction may be performed through a web server. Specifically, semantic parser NLP 112 may receive and process consumer requests to identify specific terms in this request and to generate equivalents as further explained below. In the same or other embodiments, content search engine 116 retrieves search results from exchange content database 118 and/or from metadata database 122 and provides these results to a consumer device.

Figure 3:
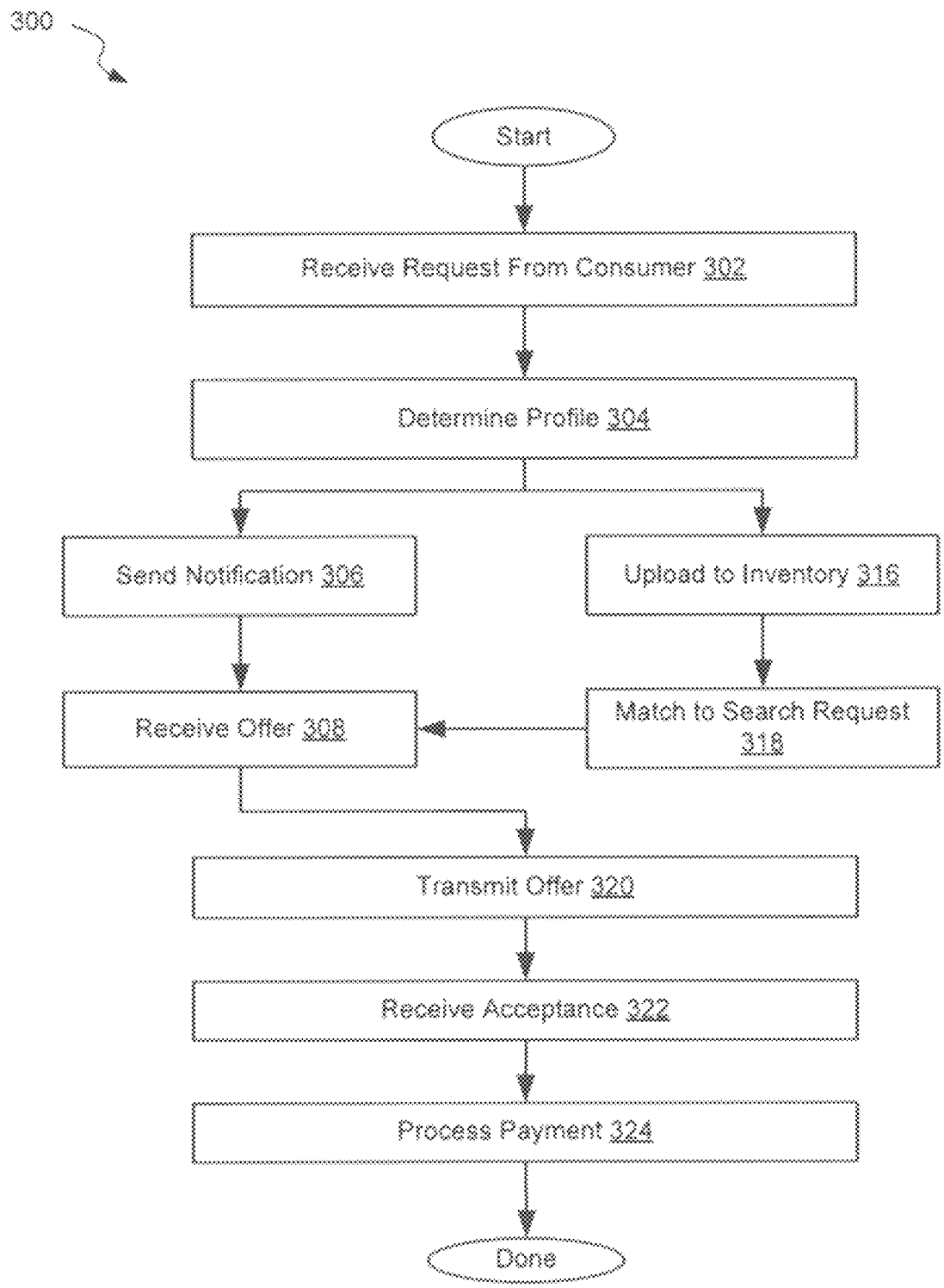
FIG. 3 is a process flowchart corresponding to a method for delivering a content record to a consumer using an exchange system.

FIG. 3 is a process flowchart corresponding to method 300 for delivering a content record to a consumer using an exchange system. Method 300 may involve receiving and parsing a request from a consumer during operation 302. Some aspects of this operation are described below with reference to FIG. 4. Based on the request, a profile associated with the consumer or with the request may be determined during operation 304. This profile may be used for parsing the request, tailoring responses, direct marketing and other purposes.

Method 300 may proceed with publishing the request in a database of the exchange system during operation 316. The publication may be made searchable to suppliers. In the same or other embodiments, the exchange system may generate matches corresponding to the requests during operation 318 and/or send notifications to selected suppliers based on information contained in the request during operation 306. These activities by the exchange system and/or suppliers may generate one or more offers received from one or more supplier systems during operation 308. The one or more offers may be then transmitted to the consumer during operation 320. The method may also involve receiving, from the consumer, an acceptance corresponding to an accepted offer selected from the one or more offer and changing a status of a content record associated with the accepted offer during operation 322. The method may also involve processing a payment associated with the accepted offer during operation 324.

Figure 4:
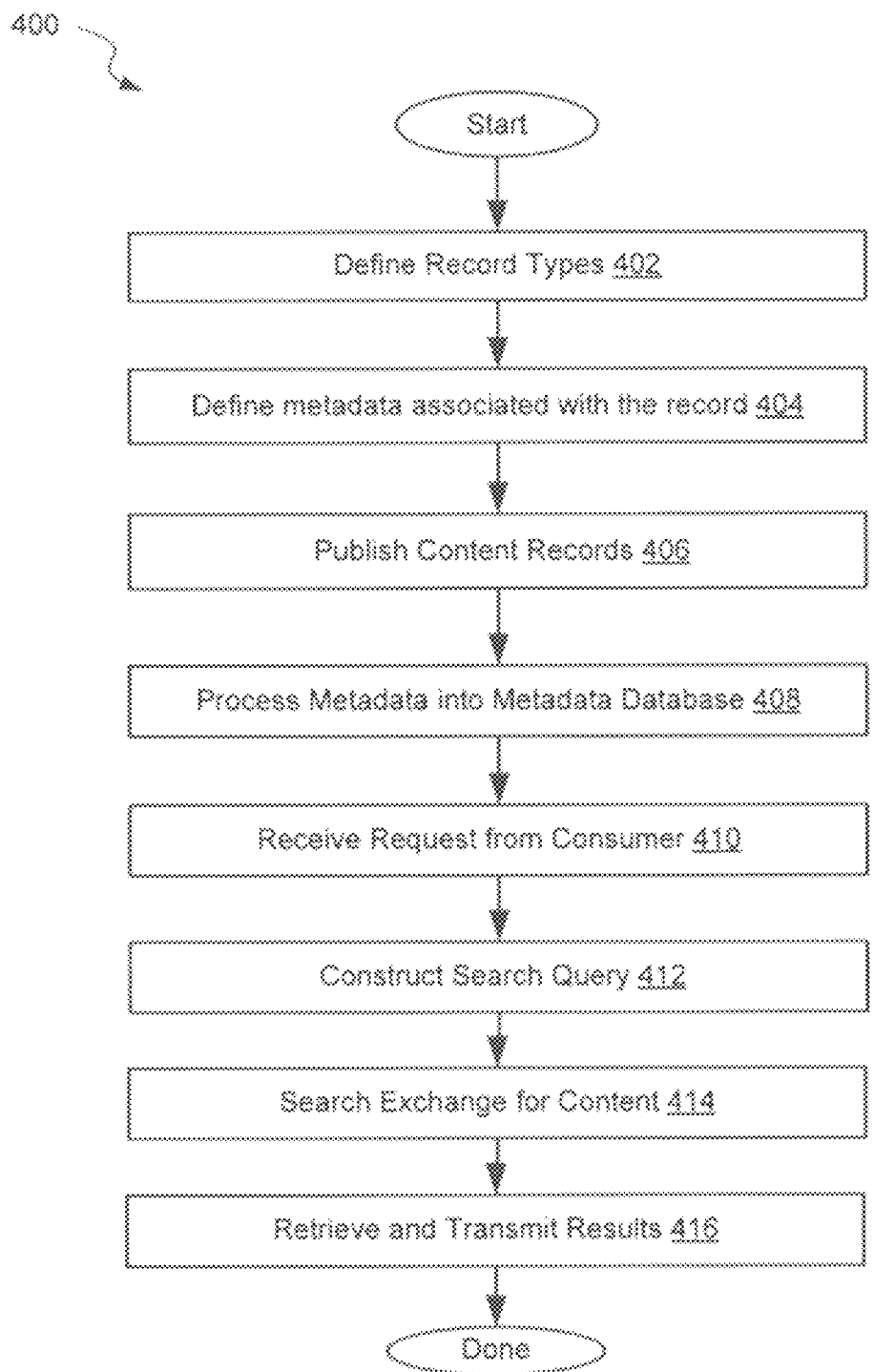
FIG. 4 is a process flowchart corresponding to a method for publishing content in an exchange system for viewing by customers.

FIG. 4 is a process flowchart corresponding to method 400 for publishing content in an exchange system for viewing by customers. The exchange system provides an open exchange to which suppliers can self-publish their content, maintain control over, and manage their content utilizing the following operation. Method 400 may commence with receiving a content record from a supplier system and defining a type of the content record during operation 402. Any content presented to the exchange system by a supplier or defined by the exchange internally is viewed as a separate record. Each record corresponds to an instance of content. Associated with each record or content are metadata tags. These metadata tags qualify, quantify, describe, and govern the content. A tag is a non-hierarchical keyword or term assigned to a content record. This kind of metadata helps describe an item and allows it to be found again by browsing or searching. Metadata tags may be chosen suppliers, exchange systems, and even by consumers. The supplier can define any content and any number of associated metadata tags for that content. One can think of this content as the supplier's inventory.

In certain embodiments, the exchange system already contains record definitions for a majority of the common travel content, such as air tickets, hotels, cars, tours, and the like in the presented example. In these cases the exchange provides default record types to the supplier together with a list of the common metadata tags. One example of such default record types for airline reservation is presented in FIG. 6. The supplier can add his own metadata which can be made exclusive to the supplier.

During operation 402, the record type declaration associates content with a record, e.g., {Record="Carry-on"}. Additionally, the record can be given a contextual reference, such as this content applies to air travel, e.g., {Record="Carry-on", Context or reference="air travel"}. Alternatively, the contextual reference may not be provided and, in the future, it may be inferred from the data and referenced by the exchange.

Method 400 may proceed with defining metadata associated with the content record during operation 404. A supplier may define this content by creating a set of metadata, as presented in FIG. 6. This metadata is also published to the exchange systems together with the content record. Once published, actual inventory records that include metadata tags can be placed on the exchange. A supplier can add new content or extend current content dynamically as needed. A supplier can interrogate content metadata on the exchange system as well as modify or add new metadata. A supplier can also directly control all actual records placed on the exchange and obtain information about inventory of content records. These functions may be available through various APIs.

Method 400 may proceed with publishing the content record in a public domain of the exchange system during operation 406. The public domain is viewable and searchable by one or more consumers. Specifically, the record and metadata are sent to the exchange, either using APIs or as files containing many records. The exchange may allow vendors to synchronize portions of databases for publications and updates of multiple records. When record and metadata definitions are published to the exchange system, the exchange system will return the status of the publication (i.e., success of the publication or fail). In the case of failure, the reasons for failure will be provided.

Publishing operation 406 may also involve content verification. In general, the exchange system accepts all content definitions. Therefore, some control over the content may be needed. For example, content may be verified that does not contain any illegal or derogatory terms. This operation may be performed based on text search queries for specific words. Furthermore, substance of the content may be verified to determine its completeness, proper categorization (e.g., air fare is presented as travel service and not, for example, health care service), and other characteristics. This content verification may be performed using security agents that oversee the proper use of the exchange and its content.

Method 400 may proceed with processing the metadata to create one or more natural language parser (NLP) components during operation 408. As explained above, the metadata may be stored in a metadata database of the exchange system. The database contains the metadata record together with the identification of the supplier and other information which may be used for parsing. Operation 408 may involve creating associated entries into pattern recognition AI component. The Pattern Recognition AI Component may include a phrase database, inference module, equivalence class partition module, and (optionally) metadata database.

Prior to performing operation 408, content records may be already partitioned at least according to the top categories, such as flight, hotel, and car rental. This partitioning is used to apply a specific parser that is tuned to keywords common in this category. As such, when content to be searched and consumed is added to the exchange system, the system allocates it into a specific category so the appropriate parser is applier.

As a starting point, a category for placing metadata record is determined. For example, a supplier may send a metadata record with the following information: "Record Type, Meta Data name, a Value set, a Value Type, an Inference tag". In a specific example, values may be "Carryon, Carryon, (0,1,2), Integer, Flight". The inference tag in this example can determine that record should be allocated into the flight category. As such, when a consumer asks for a carryon in a travel request, the exchange system knows to invoke flight nodes of an itinerary. The exchange system check if such a category exists (e.g., flight). If the system cannot identify a proper category, it may create a new category for this record and place it in there. The creation of a new category may be assisted by a supplier that provided a record and/or an administrator of the exchange system.

Each top level category may be further partitioned into content or record type tags. Using a flight example, categories may include seats, carryon, priority check in and boarding, food and beverage, and the like. This information is presented to the exchange system by a supplier and developed into record types. The exchange system checks for existence of the category and makes a decision about placing into this category. The content is additionally partitioned according to its attributes. A single content record can have multiple attributes associated with it. For example, a flight includes seating legroom, pricing, seating class, emergency exit, kids section, and the like. The metadata data is used to create and apply phraseology to consume the content.

Another step in this operation is creating an equivalence class of phrases used by a pattern recognition AI. Three pieces of information are extracted from the metadata record during this step, such as a name, value type, and value set. The value type tells the exchange system what kind of pattern the exchange system should be looking for. The exchange system uses different patterns when considering a single quantity of something against a range of options. The exchange system then considers a value set, which is a list of admissible options for the content being requested. The exchange system then creates a list of patterns. These patterns determine many different ways in which a consumer can ask for the value set with the metadata name. All these statements are equivalent in which content they are relating to.

This parsing and equivalence determination makes the exchange system suitable for many variations of languages, vocabularies used by consumers, and other functions. For example, one consumer may send a request for a flight using a rather sophisticated vocabulary, while another person may use slang. The system may be tuned to recognize and process these requests in a similar fashion. In certain embodiments, the system may use variations in the request to build a profile associated with a requestor and later use this profile to tailor specific offering or to parse requests in specific manner. Overall, as long as the pattern of speech fits one of the options in our equivalence class, the exchange system will be able to analyze the request in an accurate manner. The pattern recognition AI allows the exchange system to cover the entire lexicon of travel and other types of content and all the mannerisms in which it can be phrased. It may do these functions dynamically, with no restrictions on content, which makes the system a lot more flexible and user friendly in comparison to various legacy systems that are used for travel reservation, for example.

When the parser encounters a metadata record but does not recognize the phraseology, the exchange system may use its heuristic component to learn the new phrase and append it to the equivalence class. The system may also have the ability to hold the entire content for the hospitality and other market and extends to cover the entire lexicon for travel. In this sense it acts as a super aggregator of content, suppliers, and customers. In an associated patent, the exchange system shall see how it also resolves the logistics, simplifies, and resolves the understanding of the supply chain to create further efficiencies and enabling the consumption of additional content.

A specific code, for example, used for publication of records and metadata is presented below:

```
string seat;
    for (int i = 1; i < 30; i++)
    {
        // 1. Create the document using the type name
        document = new SpaceDocument("Flight");
        // 2. Create the properties:
        document["Carrier"] = "AC";
        document["Route"] = "YYZSEA";
        document["FlightNo"] = "541";
        seat = i.ToString( )+"A";
        document ["Seat"] = seat;
        if (i < 5)
        {
            document["Price"] = 600f;
        }
        else
        {
            document["Price"] = (float)(200 +(120-2*i));
        }
        document["Tags"] = new String[ ] { "heavy", "anvil" };
        if (seat == "12A")
        {
            document["ElectricalOutlet"] = "Yes";
            document["Price"] = (float)(200 + (120 2 * i)+10);
        }
        // 3. Write the document to the space;
        proxy.Write(document);
    }
```

In this code example, the exchange system is generating records that describe window seats on Air Canada flight 541 from Toronto to Seattle, in which the price of the window seats declines as you move further back in the aircraft. Also, seat 12A has an electrical outlet and the airline is charging an extra $10 for this seat.

A supplier may also add time frames for his or her content records, such as an expiry date and time to the record. This feature may be used to automatically remove records from the exchange. For example, records corresponding to flights that have occurred may be automatically removed from the exchange system. Furthermore, a supplier may also create a rule that establishes a time frame for reserving and holding a reservation. After expiration of this time frame, the content record goes back into the public domain. Additionally, a supplier can set rules for creating time dependent pricing schemes, marketing campaigns, and the like.

Figure 7:
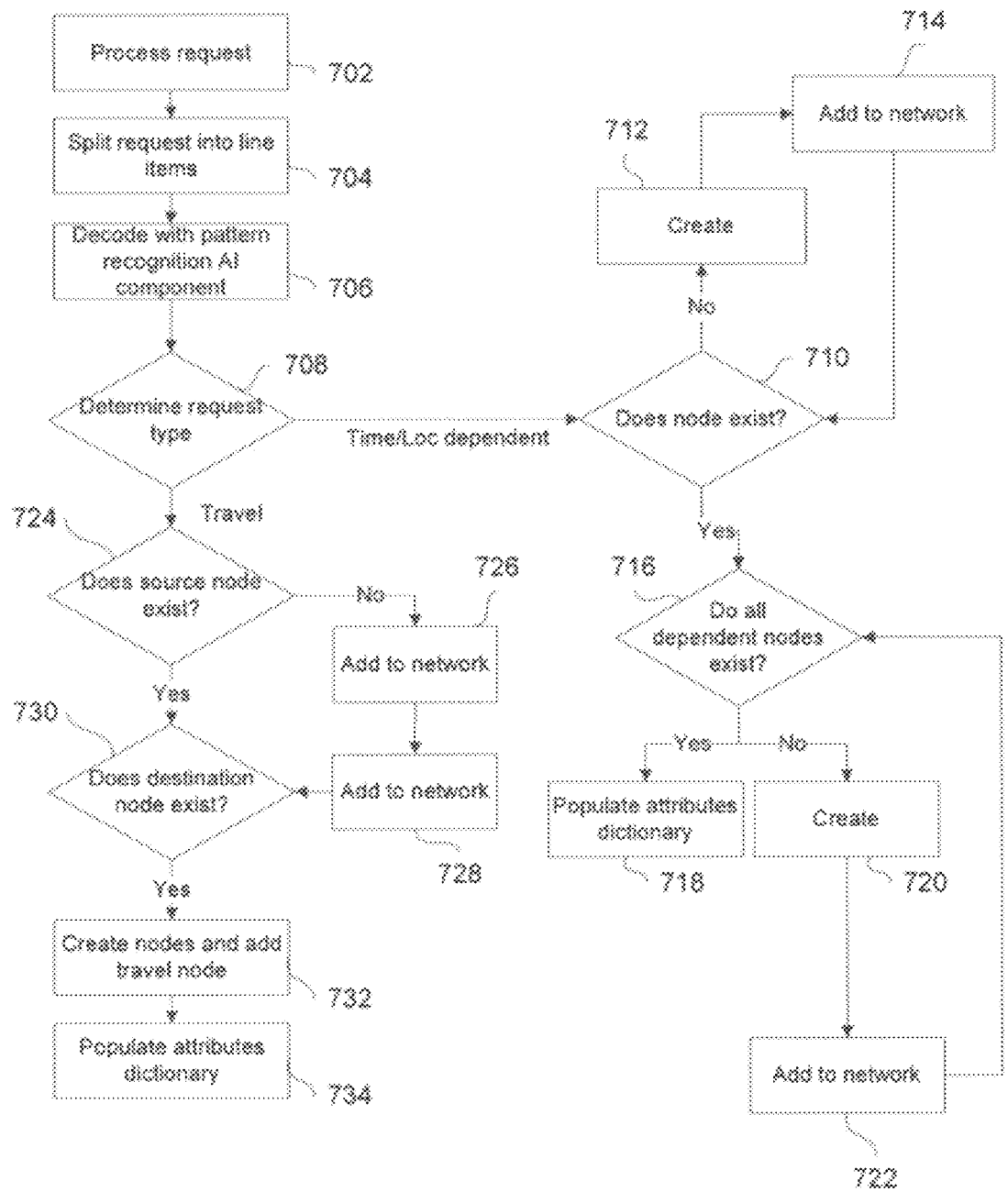
FIG. 7 is a process flowchart corresponding to a technique of parching consumers requests.

Returning to FIG. 4, method 400 may involve receiving and parsing a request from a consumer during operation 410. A consumer, which could be a travel agency or a traveler, may present a text string written in a natural language, e.g., "I want to buy a carry-on for a flight on 2012 Mar. 22 from Toronto to Seattle." The exchange system proceeds with validating and adding this request to the exchange's databases. One of these databases and corresponding interfaces may be referred to as an exchange store. Parsing involves taking the natural language expression and processing as shown in FIG. 7. The first step is to take the request string and delimit it. In may be done on a per sentence basis where each itinerary component is properly contained in that sentence. Then the exchange system may loop through each delimited string and send it off to be decoded by the pattern recognition AI. The exchange system uses a combination of phraseology and keyword inference to determine what type of request is being made. The metadata database and AI Equivalence class database may be referenced during this operation. Key words in the AI Pattern Recognition Database may point to content categories. The AI Module uses other inferential techniques as well as statistical techniques and frequency to determine where and how to match content.

For instance, if the request contains the word "stay", the exchange system may infer that a request is related to lodging and will focus a search on various phrases in this category. If a match is found, then the exchange system drops the request into the hotel category of the metadata database and repeats the process for relevant content. If a match is not found, then the exchange proceeds with searching the remaining phrases and/or other categories. If the match is still not found after reviewing the request in its entirety, then the exchange system may ask the consumer to define the meaning of some terms in the original request or provide additional information.

The pattern recognition AI looks at each word in the sentence, picking up keywords such as 'From', 'To', 'Class', 'dollars', and so forth. When it finds one, it drops down into the appropriate equivalence class of phrases that deal with that keyword. For example, the flight metadata 'cost' has many keywords such as "$", "dollars" (and other currency identifiers), "fee", and the like. The parser drops into the equivalence class of phrases for cost, one of which might be "{integer value 0-9 repeated 600 times} dollars". As a part of the overall process, the parser may loop through all the admissible phrases until the one the consumer input hits a match. Following that match, the parser decodes that part of the sentence associated with the match. Decoding may be performed using the mechanism described above for the metadata records.

The parser then proceeds with checking the remaining portions of the sentence and repeats the process until the last word. If no keywords are found, nothing is constructed. The pattern AI has an equivalence inference which allows for some variation among the phraseology to account for different ways of saying things, incorrect spelling, and similar contingencies.

Method 400 then proceeds with constructing a search query from the request during operation 412. The search query may be an SQL-like search expression that is supported by the exchange database. It can be automated from the search request. Method 400 then proceeds with searching the exchange databases for content during operation 414 and retrieving and transmitting results to the consumer during operation 416.

Figure 5:
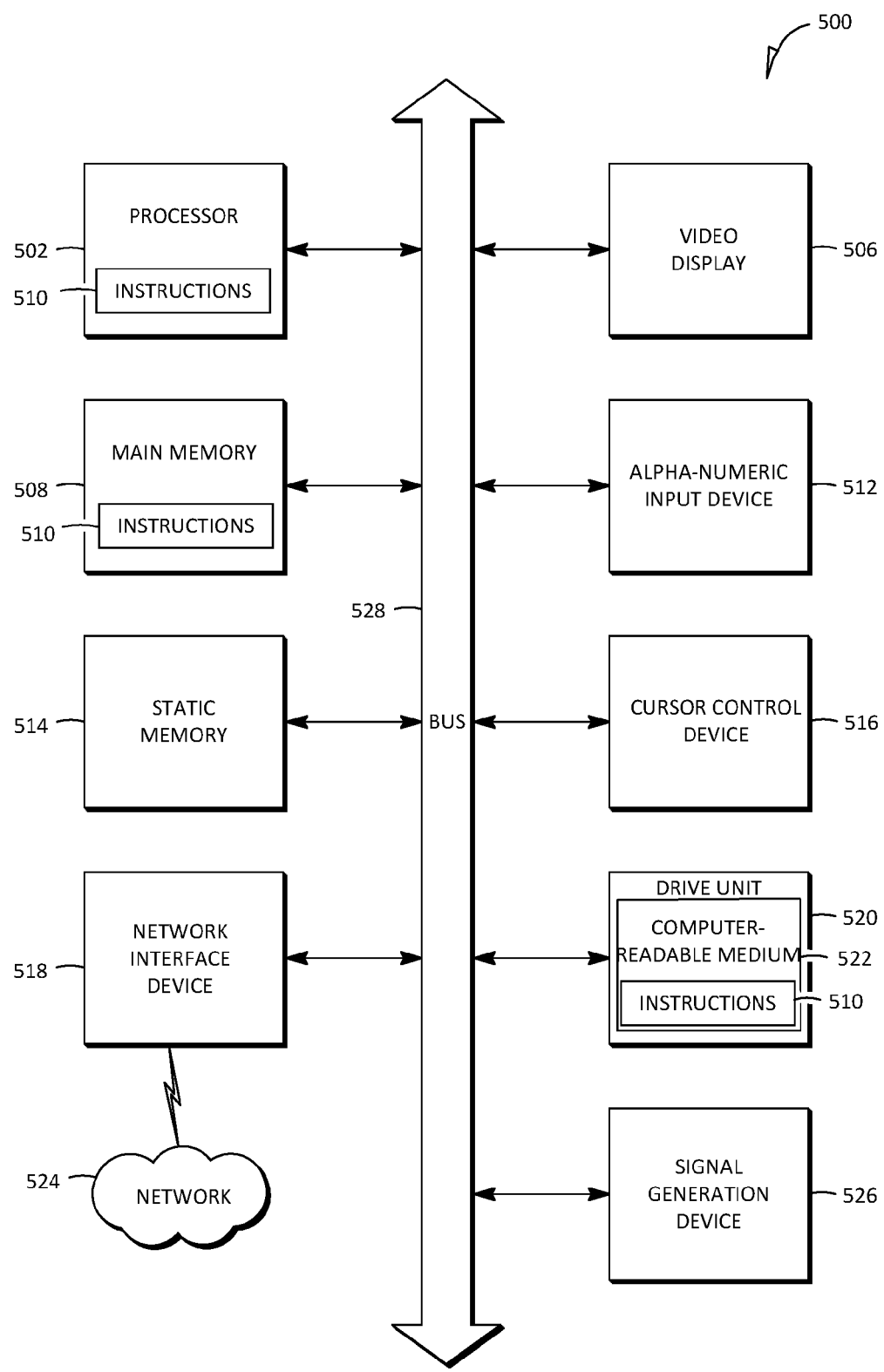
FIG. 5 is a diagrammatic representation of an exemplary machine in the form of a computer system, within which a set of instructions for causing the machine to perform any one or more of the methodologies discussed herein may be executed.

FIG. 5 is a diagrammatic representation of an exemplary machine in the form of a computer system 500, within which a set of instructions for causing the machine to perform any one or more of the methodologies discussed herein may be executed. In various exemplary embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor or multiple processors 502 (e.g., a central processing unit (CPU), a graphics processing unit (GPU), or both), and a main memory 508 and static memory 514, which communicate with each other via a bus 528. The computer system 500 may further include a video display unit 506 (e.g., a liquid crystal display (LCD)). The computer system 500 may also include an alphanumeric input device 512 (e.g., a keyboard), a cursor control device 516 (e.g., a mouse), a voice recognition or biometric verification unit, a disk drive unit 520, a signal generation device 526 (e.g., a speaker) and a network interface device 518. The computer system 500 may further include a data encryption module (not shown) to encrypt data.

The disk drive unit 520 includes a computer-readable medium 522 on which is stored one or more sets of instructions and data structures (e.g., instructions 510) embodying or utilizing any one or more of the methodologies or functions described herein. The instructions 510 may also reside, completely or at least partially, within the main memory 508 and/or within the processors 502 during execution thereof by the computer system 500. The main memory 508 and the processors 502 may also constitute machine-readable media.

The instructions 510 may further be transmitted or received over a network 524 via the network interface device 518 utilizing any one of a number of well-known transfer protocols (e.g., Hyper Text Transfer Protocol (HTTP)).

While the computer-readable medium 522 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The exemplary embodiments described herein may be implemented in an operating environment comprising software installed on a computer, in hardware, or in a combination of software and hardware.

Although embodiments have been described with reference to specific exemplary embodiments, it will be evident that various modifications and changes may be made to these embodiments without departing from the broader spirit and scope of the system and method described herein. Accordingly, the specification and drawings are to be regarded in an illustrative rather than a restrictive sense.

Figure 6:
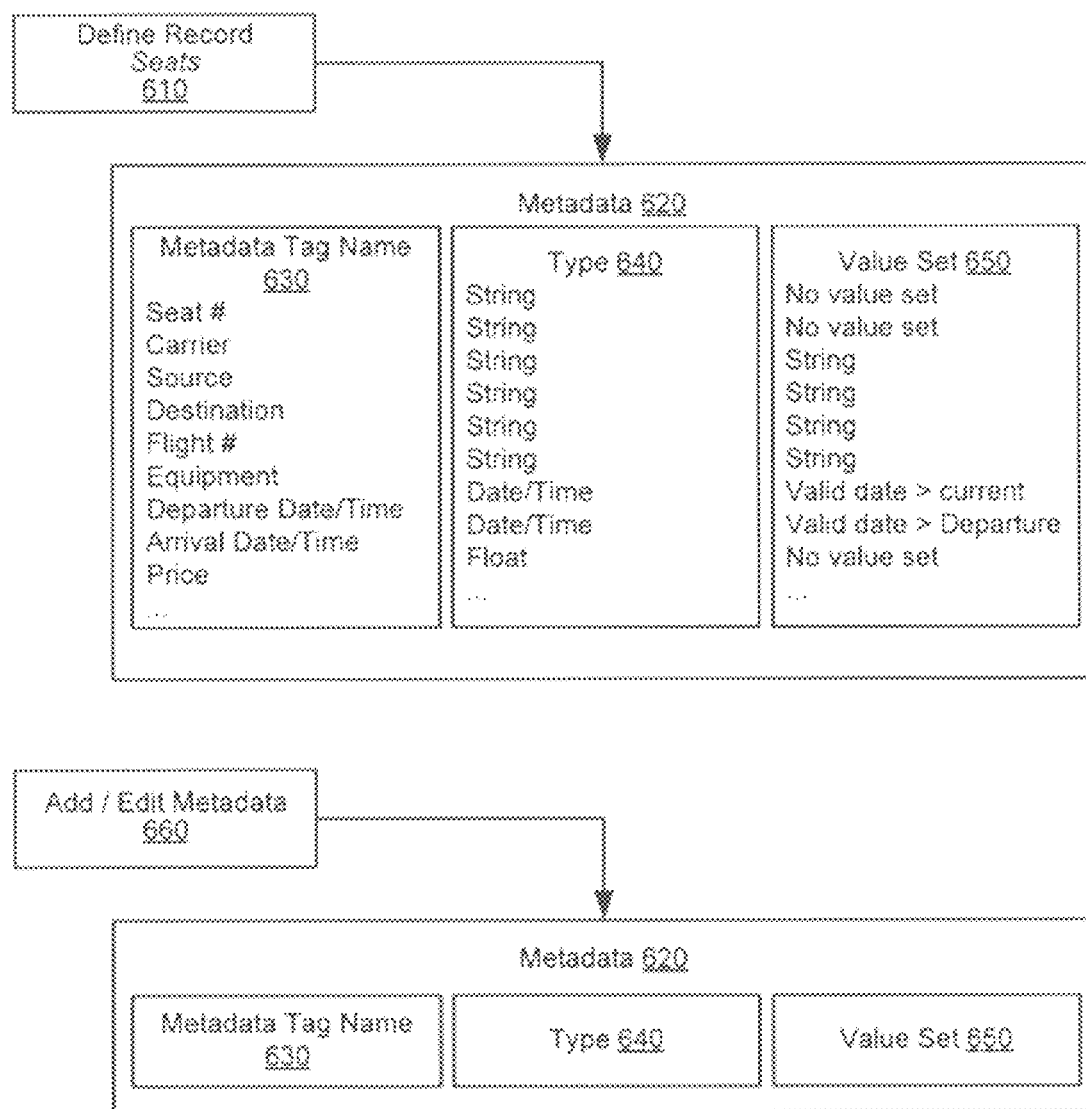
FIG. 6 is a schematic representation of metadata tags.

FIG. 6 is a schematic representation of metadata tags. To define a record Seat 610, the metadata 620 includes one or more metadata tag names 630, types 640, and value sets 650. The same pieces of information, specifically, metadata tag names 630, types 640, and value sets 650, are involved in adding/editing metadata 660.

FIG. 7 is a process flowchart corresponding to a technique of parching consumers requests. After a consumer request is received, it is processed by a parser at step 702 and then, at step 704, split into line items corresponding to a good or service required. At step 706, a pattern recognition AI component is used to decode the request. Once decoded, the request type is determined at step 708. If the request is time/location dependent, it is determined whether a node associated with the time or location exists on the itinerary at step 710. If such node does not exist, the corresponding node is created at step 712, and added to network at step 714. After the answer at step 710 is Yes, it is determined whether all dependent nodes exist at step 716. If not, the corresponding nodes at step 720 are created and added to the network at step 722. When all dependent nodes exist, appropriate attributes are populated in the attributes dictionary at step 718. Referring now to step 708, if the request type is determined to be a travel request, it is determined whether a node for the source address at step 724 and a node for the destination address at step 730 are contained in the itinerary network. If either source or destination node does not exist, these nodes are added to the itinerary network with appropriate attributes at steps 726 and 728. Based on the added nodes, the corresponding travel node is added to the itinerary network at step 732 and appropriate attributes are populated in the attributes dictionary at step 734.

A user may use a tablet or some other type of portable computers to access the exchange system described above. A tablet computer, or a tablet, is a mobile computer that is larger than a mobile phone or personal digital assistant and that is integrated into a flat touch screen and primarily operated by touching the screen rather than using a physical keyboard. It often uses an onscreen virtual keyboard, a passive stylus pen, or a digital pen. Because most of the data entry is performed on the screen, the graphical user interfaces require specific considerations, such having fields and objects that can be easily activated by touching them with a finger or a pointing device. Furthermore, when an on-screen keyboard is used, the fields that this keyboard is used to fill should be positioned in still visible portions of the screen. Some examples of tablets include Acer Iconia A500, Apple iPad, Archos 80 G9, ASUS Eee Pad Transformer, Asus Eee Slider (EP102), HP TouchPad, Lenovo IdeaPad K1, Lenovo ThinkPad, Motorola Xoom, Samsung Galaxy Tab, Sony Tablet S, and Toshiba Thrive.

Figure 8:
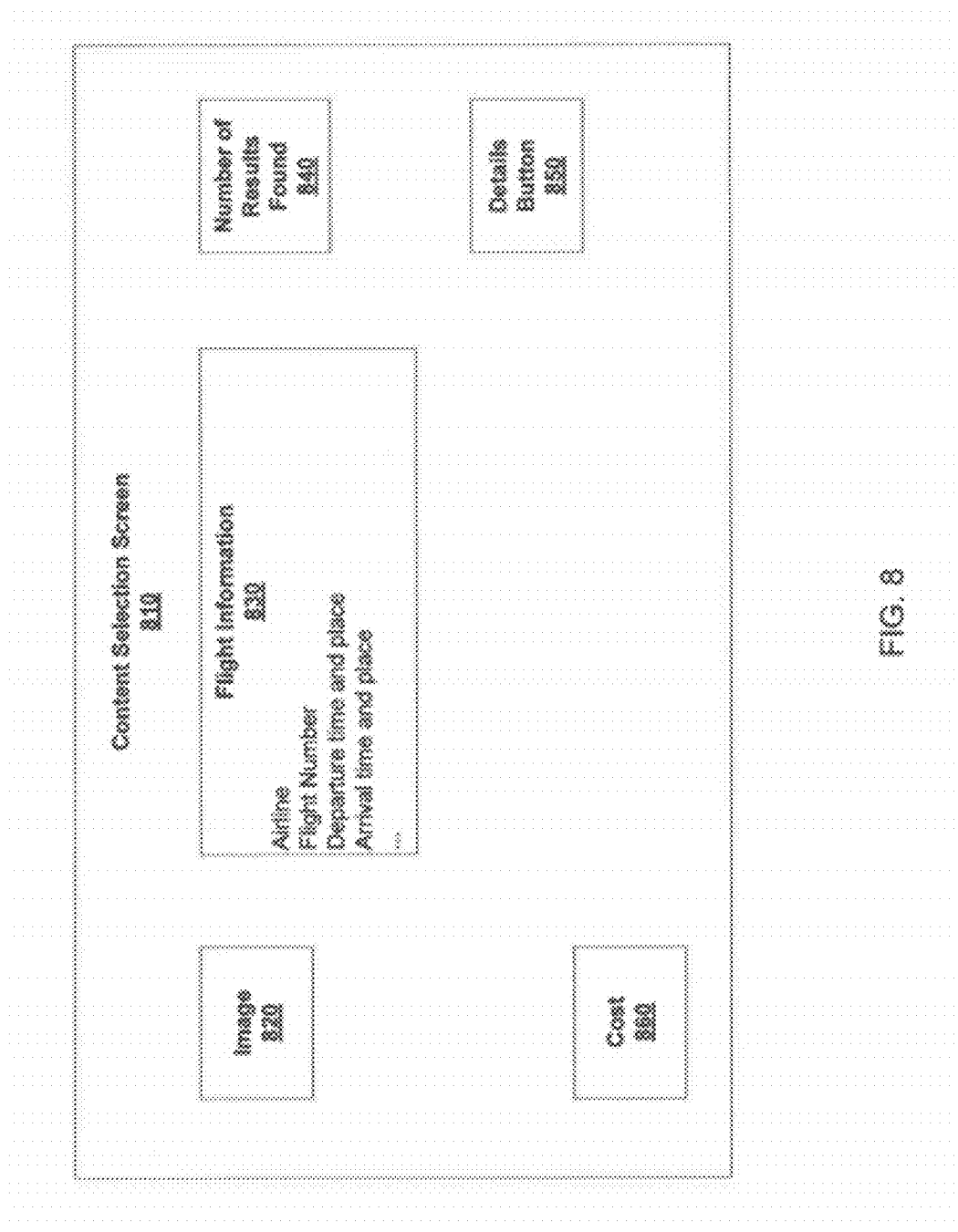
FIG. 8 is an example of a graphical user interface suitable for tablets and used for making content selection in the exchange system.
Figure 9:
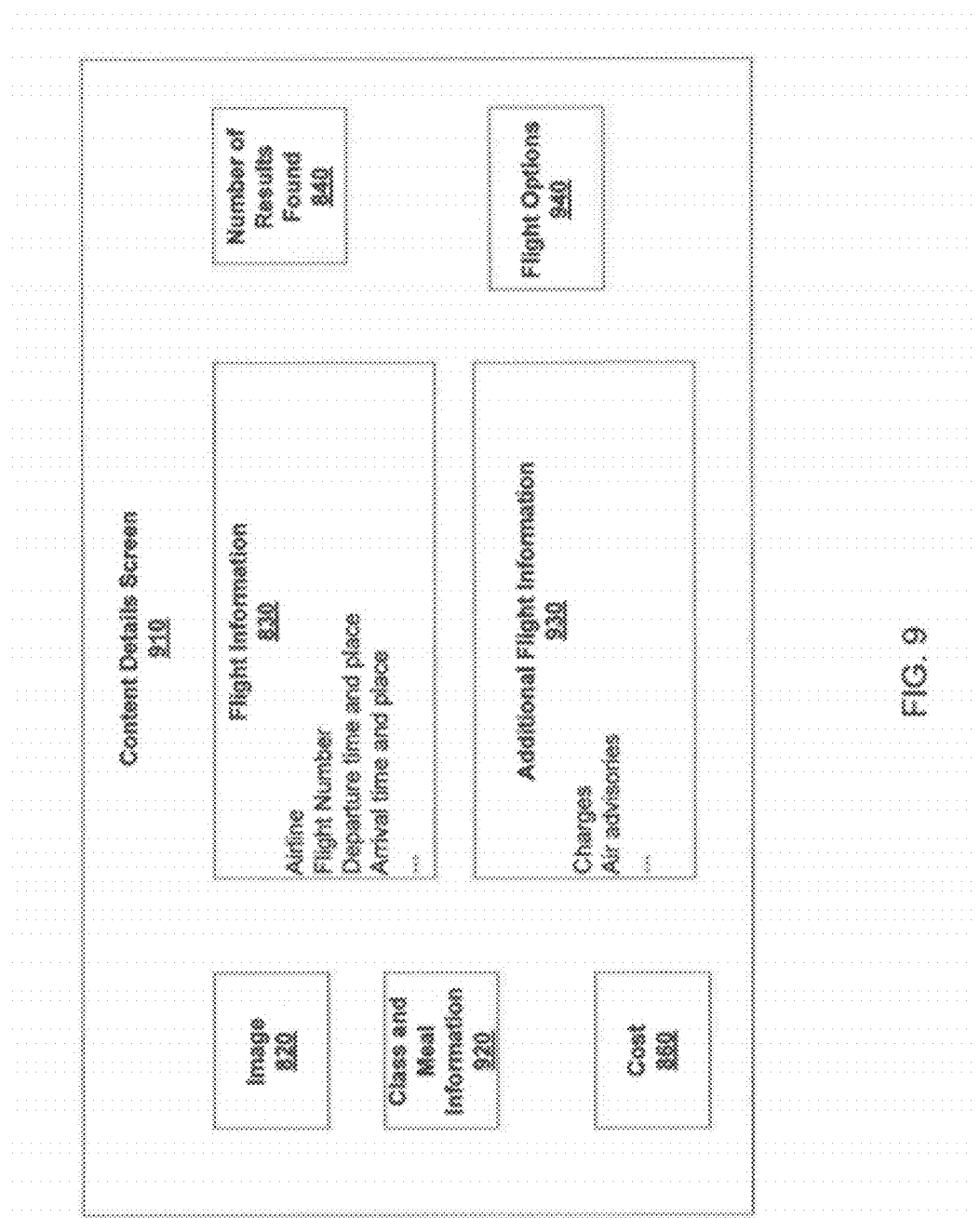
FIG. 9 is an example of graphical user interface for viewing and modifying detailed content information.

FIG. 8 is an example of one graphical user interface suitable for tablets and used for making content selection in the exchange system described above. The content selection screen 810 features large selection fields suitable for touch screens and is relatively uncluttered. If a user needs additional information, he or she may select the Details button 850 for retrieving this information. Specifically, FIG. 8 illustrates some basic flight information 830 accompanied by an image 820 that corresponds to the displayed content (i.e. flight, hotel, car rent), number of results found 840, and cost 860 for the displayed content, and allows an option for proceeding to other categories and options. By selecting the Details button 850 the user will be presented with a content details screen 910 in FIG. 9, which has flight class and meal information 920, additional flight information 930, e.g., whether the flight is non-stop, seating category, flight time, aircraft type, and other like information, and flight options 940.

Figure 10:
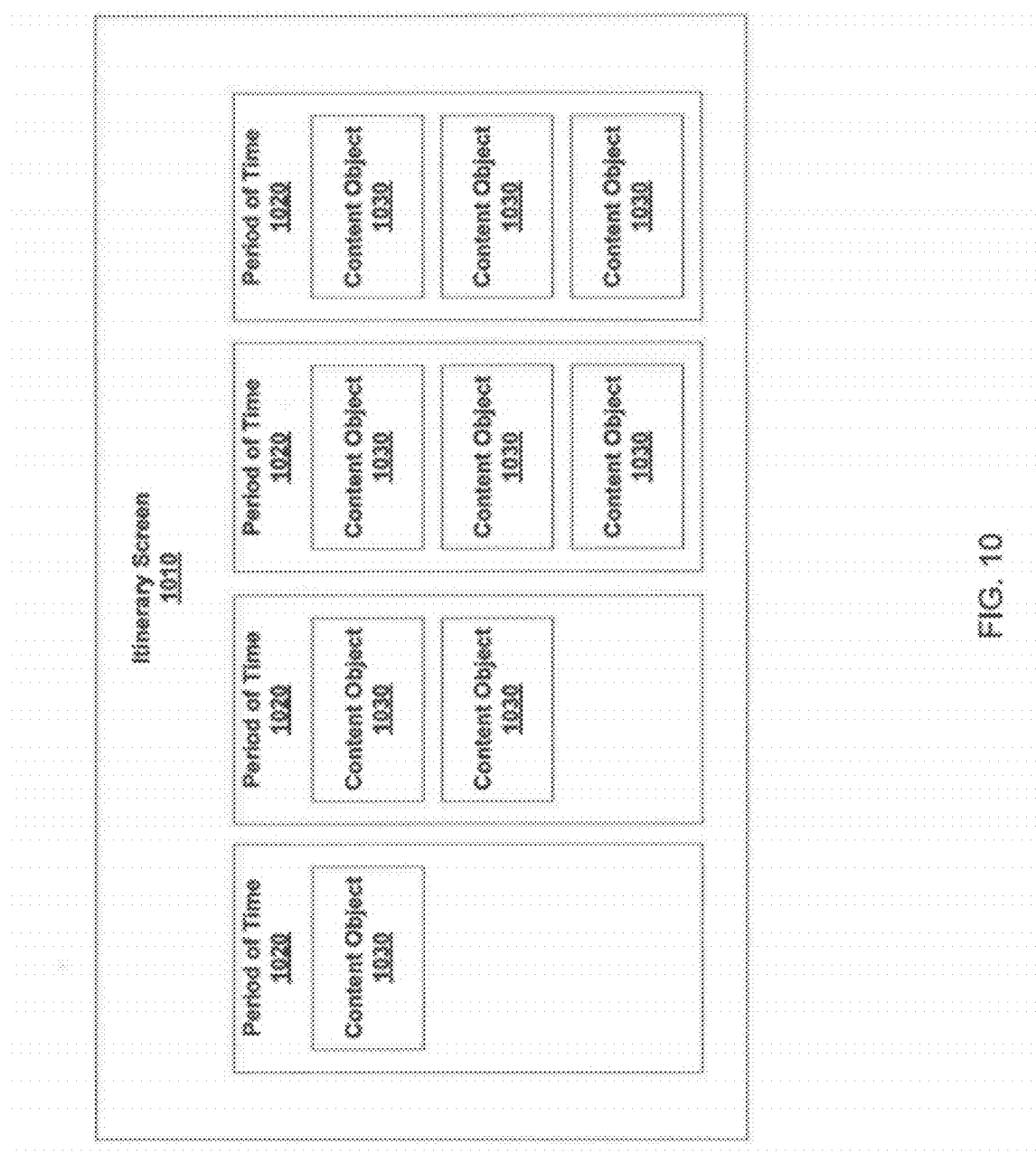
FIG. 10 is an example of a screen illustrating a complete itinerary of a consumer.

By selecting this content (e.g., a flight in the example presented in FIGS. 8 and 9), the user may add a corresponding object into his or her itinerary. An example of a screen illustrating a complete itinerary is presented in FIG. 10. The itinerary screen 1010 is divided into columns, each column representing a period of time 1020 (e.g., a day). Each column may have no objects (nothing is scheduled) or one or more content objects 1030. Multiple content objects 1030 may correspond to the same or different types of content, such as a flight, car reservation, hotel reservation. The itinerary screen 1010 may include both reserved (or selected) objects and already purchased objects. Combining both types of objects on the same screen helps with planning. Different types of content objects 1030 may be differentiated based on color or some other features.

Figure 11:
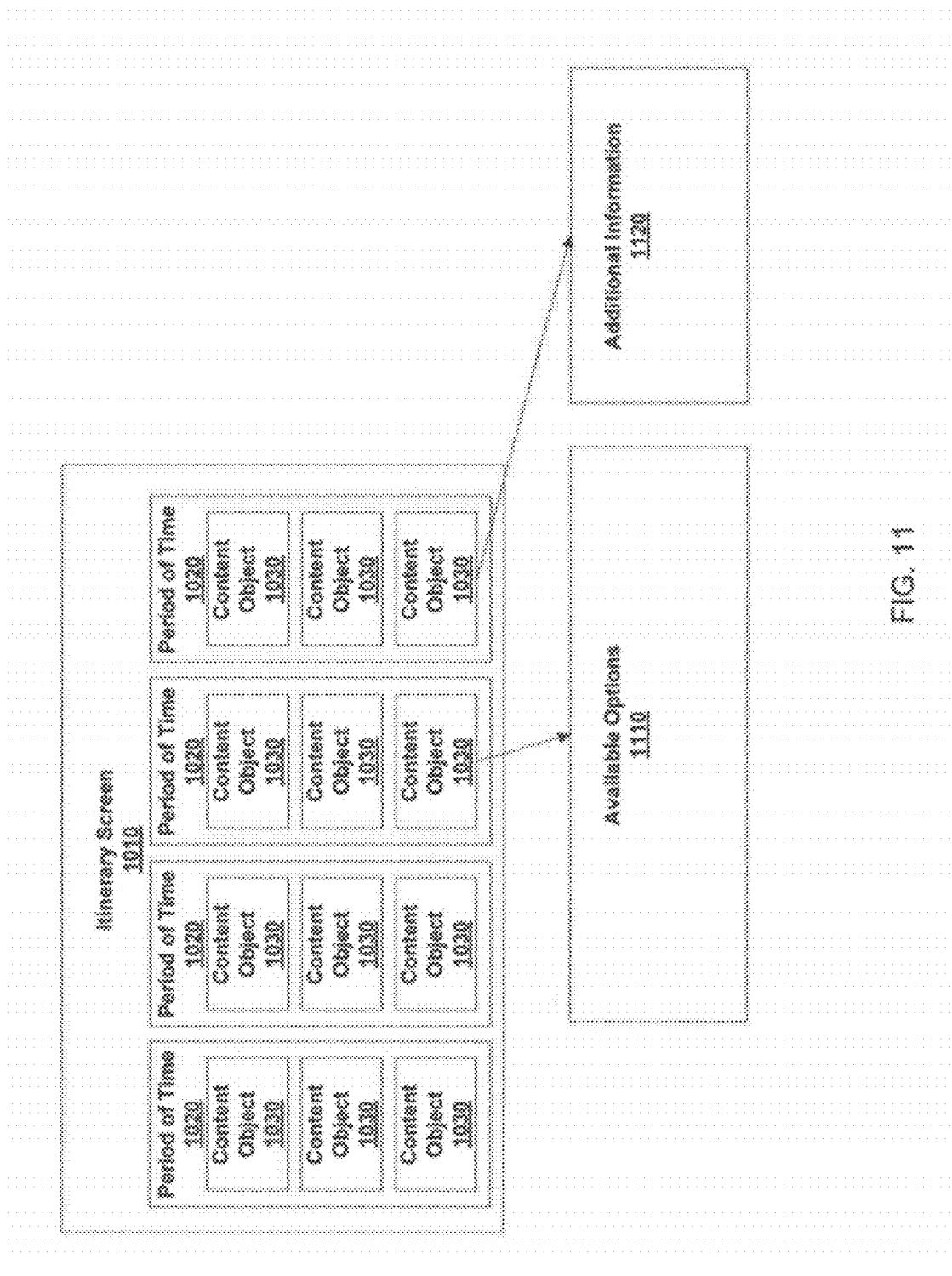
FIG. 11 is an example representation of selecting content objects to view additional information or to get a list of available options for the selected content object.

A user may modify objects and purchase content right from the itinerary screen 1010. A user may select one content object 1030 to obtain additional information 1120 as described above or to get a list of available options 1110 as shown in FIG. 11. A user may make a selection and, in certain embodiments, purchases right in this pop-up screen.

Figure 12:
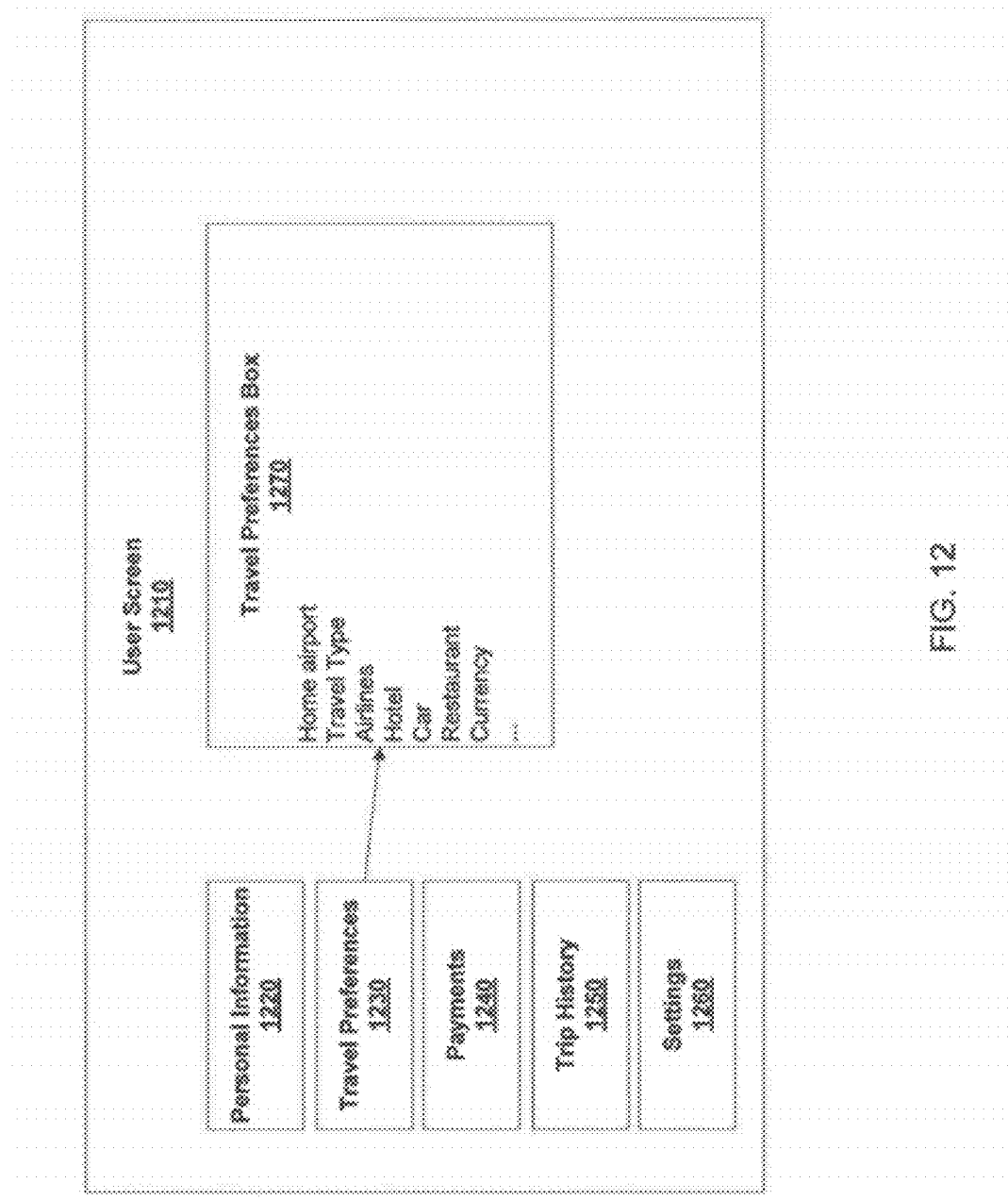
FIG. 12 is an example of a user screen meant for viewing and modifying consumer personal information, travel preferences, payments, trip history, and settings.

It is expected that users will be repetitively using the exchange system for travel planning and during travel, e.g., to review their itineraries, to make changes, and to retrieve supporting information (current exchange, country information, etc.). A user screen 1210 as shown in FIG. 12 may be used for these purposes. From this screen, a user may view and modify personal information 1220, travel preferences 1230, payments 1240, trip history 1250, and settings 1260. Specifically, FIG. 12 illustrates modifying preferences related to travelling in the travel preferences box 1270 displayed after selecting travel preferences 1230.

The invention claimed is:

1. A method for publishing content in an exchange system for viewing by customers, the method comprising:
    receiving content records from systems of a plurality of suppliers of services or goods and defining a category of service or good for each of the content records, at least a portion of the content records having a different category from one another;
    defining metadata associated with each of the content records;
    publishing the content records and metadata in a public domain of the exchange system, the public domain is viewable and searchable by one or more consumers;
    processing the metadata to create one or more natural language parser (NLP) components;
    receiving a text string request written in a natural language from a consumer;
    parsing the natural language request using one or more of the NLP components to:
    search the natural language request for keywords and phrases;
    determine a good or service category for each keyword or phrase, wherein searching comprises using an equivalence class of phrases to match at least a portion of the keywords and phrases to a content category when the keywords and phrases do not exactly match any category of the content records stored in the exchange system; and
    search the exchange system for metadata of content records that correspond to the parsed keywords and phrases, using the good or service categories determined for each of the keywords and phrases;
    constructing a search query in a format that is supported by the exchange system from the request;
    transmitting results of the search query to the consumer; and
    based on the results of the search query, posting a request for services or goods to the exchange system, wherein the exchange system is operable to send notifications to one or more suppliers selected from the plurality of suppliers of services or goods based on one or more categories included in the request.

2. The method of claim 1, wherein the categories of the content records are selected from a list comprising an air ticket category, a hotel category, a car rental category, and a tour category.

3. The method of claim 1, wherein the metadata comprises one or more value sets corresponding to one or more selected metadata tags.

4. The method of claim 1, wherein the metadata is stored in a metadata database of the exchange system.

5. The method of claim 1, wherein the one or more natural language parser (NLP) components are created based on the category of the content records and/or one or more tags of the metadata.

6. The method of claim 1, wherein processing the metadata further comprises retrieving additional attributes associated with the content category.

7. The method of claim 1, wherein processing the metadata further comprises defining an equivalence class of phrases corresponding to the one or more natural language parser (NLP) components.

8. The method of claim 7, wherein defining the equivalence class of phrases comprises extracting one or more data points from the metadata, the one or more data points are selected from a group consisting of a metadata record name, a metadata record value category, and a metadata record value set.

9. The method of claim 7, wherein the exchange system is configured to add a new phrase to equivalence classes when encountering a metadata record category.

10. The method of claim 1, wherein parsing the request comprises splitting the request into multiple line items, decoding each of the multiple lines, determining a category of the request, and matching a node to the category.

11. The method of claim 1, wherein the search query constructed from the request is an SQL search expression supported by a database of the exchange system.

12. A system for publishing content in an exchange system for viewing by customers, the system comprising:
    a processor; and
    a memory coupled to the processor, the memory storing instructions, the instructions executable by the processor to perform a method comprising:
        receiving content records from systems of a plurality of suppliers of services or goods and defining a category of service or good for each of the content records, at least a portion of the content records having a different category from one another;
    defining metadata associated with each of the content records;
    publishing the content records and metadata in a public domain of the exchange system, the public domain is viewable and searchable by one or more consumers;
    processing the metadata to create one or more natural language parser (NLP) components;
    receiving a text string request written in a natural language from a consumer;

parsing the natural language request using one or more of the NLP components to:

search the natural language request for keywords and phrases;

determine a good or service category for each keyword or phrase, wherein searching comprises using an equivalence class of phrases to match at least a portion of the keywords and phrases to a content category when the keywords and phrases do not exactly match any category of the content records stored in the exchange system; and search the exchange system for metadata of content records that correspond to the parsed keywords and phrases, using the good or service categories determined for each of the keywords and phrases;

constructing a search query in a format that is supported by the exchange system from the request;

transmitting results of the search query to the consumer; and based on the results of the search query, posting a request for services or goods to the exchange system, wherein the exchange system is operable to send notifications to one or more suppliers selected from the plurality of suppliers of services or goods based on one or more categories included in the request.

13. The system of claim 12, wherein the categories of the content records is selected from a list comprising an air ticket category, a hotel category, a car rental category, and a tour category.

14. The system of claim 12, wherein the metadata comprises one or more value sets corresponding to one or more selected metadata tags.

15. The system of claim 12, wherein the metadata is stored in a metadata database of the exchange system.

16. The system of claim 12, wherein the one or more natural language parser (NLP) components are created based on the categories of the content records and/or one or more tags of the metadata.

\* \* \* \* \*

UNITED STATES PATENT AND TRADEMARK OFFICE
CERTIFICATE OF CORRECTION

PATENT NO.        : 9,286,629 B2
APPLICATION NO.   : 13/419989
DATED             : March 15, 2016
INVENTOR(S)       : Jonathan David Miller et al.

It is certified that error appears in the above-identified patent and that said Letters Patent is hereby corrected as shown below:

On the Title Page, item 60, please add a "Related U.S. Application Data" section and insert
    --Provisional Application No. 61/452,633, filed on March 14, 2011--.

Signed and Sealed this
Twenty-fourth Day of May, 2016

Michelle K. Lee
*Director of the United States Patent and Trademark Office*